United States Patent [19]

Moustakas et al.

[11] Patent Number: 4,604,756
[45] Date of Patent: Aug. 5, 1986

[54] DEVICE FOR RECOVERING A SYNCHRONIZED CLOCK SIGNAL FROM A SIGNAL SEQUENCE

[75] Inventors: Steven Moustakas; Hans-Hermann Witte, both of Munich, Fed. Rep. of Germany

[73] Assignee: Siemens Aktiengesellschaft, Berlin and Munich, Fed. Rep. of Germany

[21] Appl. No.: 589,964

[22] Filed: Mar. 15, 1984

[30] Foreign Application Priority Data

Mar. 30, 1983 [DE] Fed. Rep. of Germany ....... 3311677

[51] Int. Cl.⁴ .......................... H04L 7/02; H04L 7/06
[52] U.S. Cl. .................................. 375/113; 360/37.1; 307/247 R; 307/595
[58] Field of Search ...................... 375/106, 110, 113; 360/43, 44, 51, 40, 42, 37.1; 370/100; 307/247 R, 593, 595

[56] References Cited

U.S. PATENT DOCUMENTS

| 3,196,358 | 7/1965 | Bagley | 307/595 |
|---|---|---|---|
| 3,581,010 | 5/1971 | Kobayashi | 375/110 |
| 4,001,611 | 1/1977 | Maruyama et al. | 307/247 R |
| 4,185,273 | 1/1980 | Gowan | 375/87 |
| 4,282,600 | 8/1981 | Zemanek | 375/113 |
| 4,313,206 | 1/1982 | Woodward | 375/110 |
| 4,361,897 | 11/1982 | Kloeber | 375/110 |
| 4,426,714 | 1/1984 | Ashida | 375/110 |

Primary Examiner—Robert L. Griffin
Assistant Examiner—Stephen Chin
Attorney, Agent, or Firm—Thomas H. Jackson

[57] ABSTRACT

A device for recovery of a synchronized clock signal from a signal sequence, in particular a random sequence, clocked at a specific frequency. The device includes a clock generator which by itself generates clock signals whose phase and frequency are tuned to the specific phase and clock frequency of the signal sequence, and which is triggerable externally by specific signals derived from the signal sequence in order to synchronize its phase and frequency with the phase and clock frequency of the signal sequence. The clock generator includes preferably a monostable multivibrator whose output signals are fed back delayed to the input serving as trigger input.

4 Claims, 3 Drawing Figures

DEVICE FOR RECOVERING A SYNCHRONIZED CLOCK SIGNAL FROM A SIGNAL SEQUENCE

BACKGROUND OF THE INVENTION

The present invention relates to a device for recovering a synchronized clock signal from a random signal sequence. The device includes a clock generator which generates clock signals whose phase and frequency are tuned to the specific phase and frequency of the signal sequence, wherein the frequency in Hertz, hereafter referred to as $f_0$, equals the numerical value of the Band of the signal sequence. The clock generator is triggerable externally by specific signals derived from the signal sequence in order to synchronize its phase and frequency with the phase and $f_0$ of the signal sequence.

In digital data transmission systems, clock pulses synchronized to the data stream received at the end of the transmission path are required to make a decision as to the digital state of each received data bit. The timing recovery from the data arriving in the receiver, which are random sequences, therefore constitutes an important requirement.

For timing recovery, so-called phase-locked loop (PLL) circuits or resonant circuits can be used, which however, are both expensive and only function properly when there are enough transitions between the two digital states of the incoming bit stream. This can be achieved by using suitable scramblers/descramblers.

SUMMARY OF THE INVENTION

It is the object of the present invention to indicate a very simply constructed device for recovering a synchronized clock signal from a signal source.

In general, the invention features a device for the recovery of a synchronized clock signal from a random signal sequence. The device includes a clock generator which generates clock signals whose phase and frequency are tuned to the specific phase and $f_0$ of the signal sequence, and which is triggerable externally by specific signals derived from the signal sequence in order to synchronize its phase and frequency with the phase and $f_0$ of the signal sequence.

In preferred embodiments of the device, the phase and frequency of the clock generator is repeatedly synchronizable by specific signals generated according to the signal sequence and occurring at intervals of time, wherein the time intervals do not exceed a maximum which corresponds to a presettable maximum number of successive clock periods of the signal sequence, wherein a signal sequence clock period in seconds, hereafter referred to as $T_0$, equals the inverse at the numerical value of the Band of the signal sequence; the clock generator has a monostable multivibrator in which output signals can be triggered by the specific signals generated according to the signal sequence, and the output of which, delayed by approximately $T_0$, can be fed back to the monostable multivibrator in order to trigger continuously new output signals of frequency approximately equal to $f_0$, which form the clock signals; the sum of the time delay for the output signals to be fed back to the monostable vibrator and the time delay through the multivibrator itself is greater than $T_0$; the specific signals generated according to the random signal sequence and the output signals of the multivibrator show certain signal edge transitions to which the multivibrator responds, and a gate to be addressed by the signals derived from the random sequence as well as by the output signals of the multivibrator to be fed back is provided, which gate is designed so that it lets through to the multivibrator the specific signal edge transition in each output signal, and also each specific signal edge transition occurring in the signals derived from the random sequence; the output signals and the specific signals derived from the random sequence have negative pulses, the leading edges of which form the specific signal edge transition to which the multivibrator responds, and the gate includes an AND element with two inputs, of which one is to be addressed with the signals generated according to the random sequence and the other with the output signals to be fed back, or the specific signals derived from the random sequence and the output signals of the monostable vibrator have positive pulses, the leading edges of which form the specific signal edge transition to which the multivibrator responds, and the gate includes an OR element with two inputs, one of which is to be addressed with the signals generated according to the random sequence and the other with output signals to be fed back; the signal-forming system which generates the specific signals according to the random sequence comprises a delay section and a comparator gate, and the comparator gate compares the signal values of the random signal sequence with those of the delayed random signal sequence and delivers a signal only when, and as long as, the signal values of the undelayed and of the delayed sequences differ.

The invention is based upon the finding that for most uses, and in particular in data transmission systems, a synchronized clock signal, as described above, recovered from the data is sufficient even though it may vary somewhat in its phase and in its duty cycle. Such a recovered clock signal is sufficient, for example, if the bits must be interrogated only for their state and it is not necessary to effect a reforming of the data which is exact in time, as may be the case when the data are to be sent along the transmission path again after encountering a repeater.

With a device according to the invention, the synchronized clock signal can very easily be obtained in an advantageous manner from scrambled NRZ data. Redundance is not required and the bit rate of the section equals the wanted data rate, so the desired data rate need not be lowered.

Advantageously, in particular by comparison with previously used PLL circuits or resonant circuits, a device according to the invention has a very simple construction which is realizable with only a few digital components.

With the device according to the invention, a synchronized clock signal can advantageously be generated which as to frequency and phase concords sufficiently well with the phase and $f_0$ of the data.

In an especially appropriate design of a device according to the invention, the clock pulse delivered by the clock generator is, in limited intervals of time, brought into phase again and again with the rhythm contained in the signal sequence; it is thereby ensured that the delivered clock pulse cannot differ too much from the rhythm of the signal sequence as to phase.

Entering into consideration as the specific signals derived from the signal sequence used for triggering are primarily certain signal edge transitions of the signals derived from the signal sequence, preferably the leading edges of timed pulses, which form the signals derived from the signal sequence.

In order that, with binary pulse sequences, such leading edges or specific signals will occur again and again at sufficiently small intervals of time, the pulse sequence from which such leading edges or specific signals are generated is appropriately scrambled.

In an advantageous device of especially simple construction it is expedient to select the delay for the multivibrator output signal to be fed back to be somewhat longer than the length of the specific clock period. It is thereby assured that the triggering edge due to a data pulse always appears before the triggering edge of a delayed output signal.

It is also expedient to provide a signal-forming system which, at all edge transitions in the signal sequence, generates a brief signal of one and the same polarity which is usable for triggering the monostable multivibrator.

Other features and advantages of the present invention will become apparent from the following detailed description, and from the claims.

For a full understanding of the present invention, reference should now be made to the following detailed description and to the accompanying drawing.

DETAILED DESCRIPTION

Figure 1:
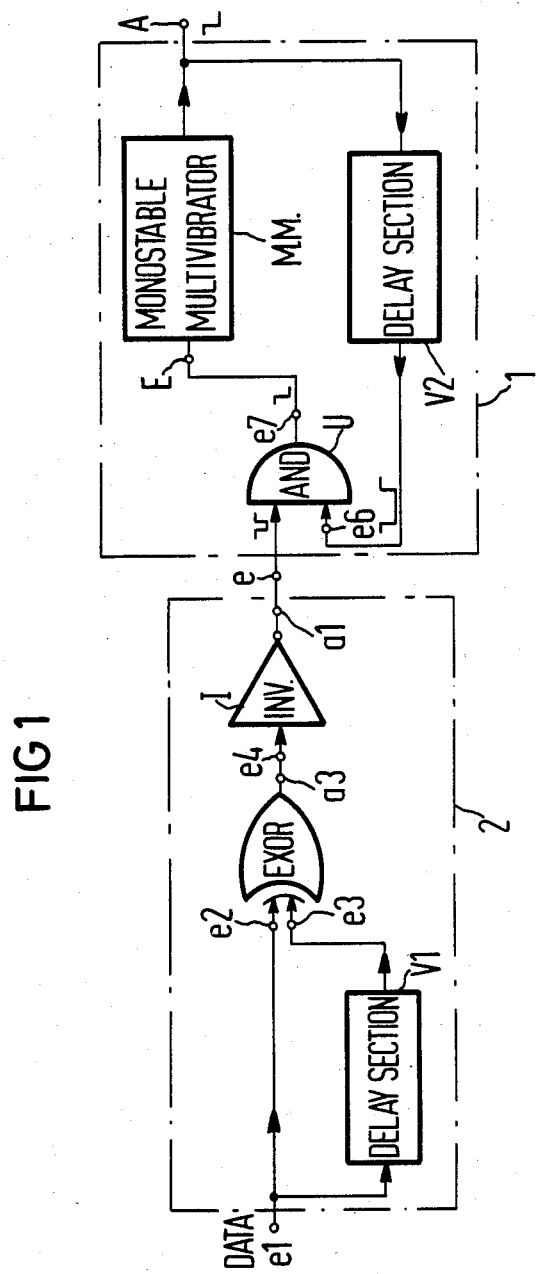
FIG. 1 shows diagrammatically the circuit of a complete device according to the invention.

The device shown in FIG. 1 includes triggerable clock generator 1, the trigger input e of which is preceded by signal-forming system 2.

The signal sequences in the form of data are supplied to input e1 of the signal-forming system. Then they are supplied on the one hand to a first input e2 of an exclusive OR circuit EXOR, and on the other hand, via delay section V1, to a second input e3 of the exclusive OR element EXOR. The time delay of delay section V1 is at least the minimum pulse width required to trigger the monostable multivibrator and at most the difference between the specific clock period with which the data are timed and the recovery time of the monostable multivibrator, wherein the recovery time is the time required by the monostable multivibrator, after its output has returned to its stable state, before its output can be retriggered into the unstable state by the next leading edge transition.

Assuming for example that the pulse duration of the data pulses corresponds to the duration of the specific clock period of the data, delay V1 and the exclusive EXOR bring about the result that at all edges of the data pulses there appears at output a3 of the exclusive OR section, pulses of one and the same polarity, the pulse duration of which is shorter than the duration of the specific clock period of the data. The duration of the shorter pulses equals the time delay of delay section V1.

The short pulses from output a3 of the exclusive OR element EXOR are supplied to an input e4 of inverter I, the purpose of which will be explained below. The output a1 of this inverter I is the output of signal-forming system 2.

The short negative pulses appearing at this output a1 are supplied to trigger input e of clock generator 1. Clock generator 1 includes a monostable multivibrator M.M. with an input E and an output A, which is connected to the input E via delay section v2 and an AND element U. Output A of the multivibrator may also be the output of clock generator 1, at which the clock signals to be generated are delivered.

The monostable multivibrator is to be triggered for example by a negative pulse edge at input E which corresponds to a signal change from '1' to '0'.

The AND element U makes sure that this signal change, which forms the leading edge of the short negative pulses from the output a1 of inverter I, always gets to the input E of the monostable multivibrator M.M. For this it is necessary, however, that also the output signals appearing at output A of multivibrator M.M. are such pulses which begin with a negative edge. On this condition, the input forming the trigger input e and the other input e6 of the AND element are on '1' when there are no pulses. But then also output e7 of the AND element connected with the input of the multivibrator is, in the absence of pulses, on '1'. This is the precondition that the negative pulse edges of the short negative pulses from inverter I, which get to the AND element and which trigger the multivibrator, will always get to the input E of multivibrator M.M.

The RC constant of the multivibrator is selected so that for a certain time (e.g. one half the length of the specific clock period of the data), it remains in the unstable state. The output signals of the multivibrator are accordingly long.

The time delay of delay section V2 is to be selected so that the total delay resulting from the sum of the transit times through the AND gate, the multivibrator and delay V2 itself is somewhat greater than the duration of the specific clock period of the data. The selection of this delay is important for the following reason: If during prolonged '0' sequences or '1' sequences in the data flow given to e1, the short negative pulses fail to appear at trigger input e over several bit or clock periods, and then the output signals at output A of the multivibrator are generated via the feedback mechanism consisting of delay section V2 and AND element U and a corresponding synchronization is maintained. Because of always existing instabilties (e.g. caused by temperature fluctuations), spread between units, etc. the previously mentioned total delay resulting from the sum of the transit times through the AND gate, the multivibrator and delay section V2 itself cannot be maintained exactly and in particular cannot be selected exactly equal to the duration of the specific clock period or of a bit. As a result, the phase between the clock pulses given by the output signals of the multivibrator and the ideal clock pulses corresponding to phase and $f_0$ of the data will diverge greatly. The timing would thus be lost. However, the AND element U provides that the synchronization can always be restored when a short negative pulse from a1 and hence a negative pulse edge appears at input e. Now to make sure that the new triggering of the multivibrator can be effected by this negative edge, the negative leading edge of the delayed output signal at the outer input e6 of the AND element must not come in earlier than the negative edge of the short negative pulse from a1 at input e of this element. In order that the triggering negative edges will appear at e again and again at sufficiently short intervals of time, the data to be given to the input e1 are appropriately first sent through a scrambler, which is known to prevent overly long '0' and '1' sequences. It can thereby be achieved that the data given to e1 can always contain only a settable maximum number of duration zeros or duration ones.

Figure 3:
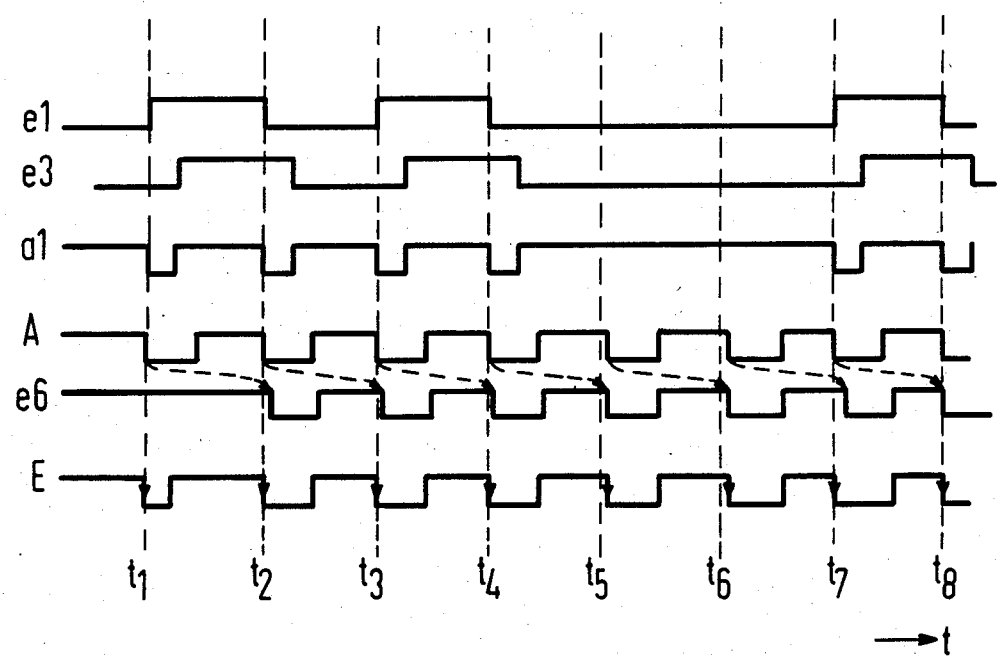
FIG. 3 shows pulse diagrams over the time t, with the times $t_1$ to $t_8$ representing the specific timing of the data.

In FIG. 3 are shown pulse sequences over the time t as they can be taken off at various points of the device according to FIG. 1.

The pulse sequence e1 represents a random section of a pulse sequence, as it occurs in data which are given to input e1 of the device according to FIG. 1 and without delay get to input e2 of the exclusive OR element EXOR. The pulse sequence e3 is the pulse sequence delayed by the uncritical time delay of the delay section V1 as it is present at input e3 of the exclusive OR element. This causes the pulse sequence a1 to appear at output a1 of inverter I. The leading edges of the negative pulses of this pulse sequence a1 trigger the monostable multivibrator M.M., and at the output A of this multivibrator the pulse sequence A appears. The triggering by the pulses of pulse sequence a1, of course, takes place only as long as pulses are present. After the fourth pulse from the left, there is no triggering by data pulses for two beats. During this time the feedback mechanism of circuit 1 becomes operative, and the multivibrator triggers itself by its delayed feedback output signals. The sequence of delayed output signals appearing at the other input e6 of the AND element is given by pulse sequence e6. The arrows in broken lines indicate the delay. The bottom pulse sequence E indicates the pulse sequence which appears at input E of the monostable multivibrator.

For use in optical data buses with data rates up to about 20 Mbit/sec it was not possible to use a separate IC in TTL logic, because at present these multivibrators in commercial technology are too slow. The minimum lengths of the input pulses required for triggering the multivibrators are too great, and also the recovery time of the multivibrator is long. For this reason the multivibrator was constructed in discrete form in S-TTL logic through two NAND gates. The setup is illustrated in FIG. 2.

Figure 2:
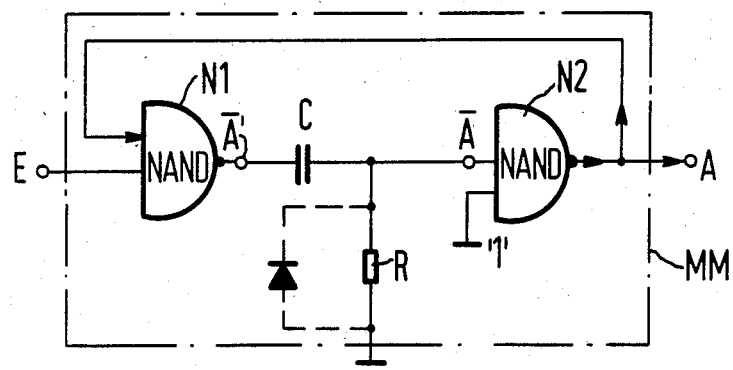
FIG. 2 shows diagrammatically the circuit of the monostable multivibrator contained in FIG. 1.

According to this FIG. 2, the multivibrator consists of two NAND elements N1 and N2, each with two inputs. One input of the NAND element N1 forms input E of the multivibrator. One output $\overline{A}'$ of this element N1 is connected via a RC element, consisting of a capacitor C and a resistor R, to an input $\overline{A}$ of the second NAND element N2, the output of which forms the output A of the multivibrator. This output A is connected back to the second input of the first NAND element N1. The second input of the second NAND element N2 is placed constantly on '1', so that this second element forms an inverter.

Attention must be paid to the following points: Just before the start of the unstable switching state of the multivibrator M.M. the potential $\overline{A}$ should be at its steady-state value of approximately 0 volts. This can possibly be achieved by a sufficiently small RC time constant. Then the duty cycle of the clock signal may become unsymmetrical and may have to be reformed; or an arrangement of the multivibrator is selected in which the charging and discharging times of the capacitor C can be selected differently; for instance, the charging time at $\overline{A}$ can be shortened as against the discharging time by using a diode as disposed parallel to resistor R in FIG. 2. In the concrete case of 20 Mbit/s data rate, these measures have not been necessary. If it is necessary that the clock pulse disappears upon termination of the data, the clock pulse may for example be sent through an AND element controlled, for example, by a data validity signal (Valid Signal).

For a realization of a monostable multivibrator according to FIG. 2, the components SN 74 S 00 of Texas Instruments were used as NAND elements. The resistance R was 390 Ohms and the capacitance C was 100 pF. A diode connected in parallel with the resistor R was not necessary.

With an embodiment of a monostable multivibrator according to FIG. 2, a device according to the invention was constructed according to FIG. 1. For the AND gate U the component SN 74 S 08 was used.

The device thus designed was tried out on a prototype passive optical star bus for 16 subscribers, 16 Mbits/s and 600 m distance between the subscribers, with good results. The comparison of the original with the recovered data showed a measured error probability of less than $10^{-9}$.

The monostable multivibrator M.M. can be made also with NOR elements. Then an OR element must be used instead of the AND element U in FIG. 1, and the inverter I is eliminated.

There has thus been shown and described a novel device for recovering a synchronized clock signal from a signal sequence, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A device for the recovery of an output clock signal from a random signal sequence, characterized by a clock generator (1) comprising a monostable multivibrator (M.M.) with an input (E) and an output (A), in which an appearance of a specific signal change (Z) at the input (E) triggers the output clock signal which is delivered at the output (A) and which likewise shows the specific signal change (Z);

the output (A) of the multivibrator being connected to a delay element (V2), which provides a delayed output, the delay being approximately equal to the clock pulse length of the output clock signal, to one input (e6) of a gate (U) which comprises two inputs (e and e6) and one output (e7), the one output of the gate being connected to the input (E) of the multivibrator, and to whose second input (e) certain signals (a1) from the random signal sequence are applied, and the gate transmitting to the input (E) of the multivibrator the specific signal change (Z) for each output clock signal of the multivibrator and also the specific signal change (Z) of the certain signals from the ramdom sequence, and a signal forming means (2) which comprises an additional delay element (V1) and an exclusive OR element with two inputs (e2, e3) and one output (a3), the random signal sequence being applied at one input (e2) of the exclusive OR element, this one input (e2) being connected by the additional delay element (V1) to the other input (e3) of the exclusive OR element, and the output (a3) of the signal forming means being connected with the input (e) of the gate (U) whose output is connected to the monostable multivibrator.

2. The device according to claim 1, characterized in that the sum of the delay produced by the delay element (V2) plus a delay time produced by the multivibrator (M.M.) is somewhat longer than the clock pulse length of the output clock signal.

3. The device according to claim 1, characterized in that the certain signals from the random signal sequence and the output clock signals of the multivibrator (M.M.) consist of negative pulses whose leading edges form the specific signal change, and that the gate (U) is an AND element.

4. The device according to claim 1, characterized in that an inverter (I) is connected between the output (a3) of the exclusive OR element and the second input (e) of the gate (U) whose output is connected to the monostable multivibrator.

* * * * *